United States Patent [19]

Kiss

[11] 3,951,911

[45] Apr. 20, 1976

[54] STABILIZED PROPYLENE-BASED POLYMER COMPOSITIONS

[75] Inventor: Kornel D. Kiss, Yonkers, N.Y.

[73] Assignee: Dart Industries Inc., Los Angeles, Calif.

[22] Filed: Nov. 22, 1974

[21] Appl. No.: 526,085

Related U.S. Application Data

[63] Continuation-in-part of Ser. No. 464,409, April 26, 1974, abandoned.

[52] U.S. Cl..................... 260/45.85 B; 260/45.85 S; 260/45.9 NC
[51] Int. Cl.$^2$............................................ C08J 3/20
[58] Field of Search............. 260/45.9 NC, 45.85 S, 260/45.85 B

[56] References Cited

UNITED STATES PATENTS

| | | | |
|---|---|---|---|
| 3,285,855 | 11/1966 | Dexter et al.  | 260/45.85 |
| 3,378,516 | 4/1968 | Tholstrup et al. | 260/45.85 |
| 3,564,076 | 2/1971 | Kauder | 260/45.95 R |
| 3,734,885 | 5/1973 | Muller et al. | 260/45.9 |
| 3,806,358 | 4/1974 | Glander et al. | 260/45.9 |
| 3,826,781 | 7/1974 | Turbett | 260/45.95 |

*Primary Examiner*—V. P. Hoke
*Attorney, Agent, or Firm*—Arthur S. Collins; Fred S. Valles; Bryant W. Brennan

[57] ABSTRACT

Propylene-based, normally solid polymer compositions are stabilized against oxidative degradation especially when exposed to both a metal such as copper and a soft hydrocarbon medium such as petrolatum. Highly synergistic levels of stability are achieved by combining in said polymer compositions three different stabilizer additives (a), (b) and (c) as follows:

a. between about 0.4 and about 1.6% by weight of the tetraester of pentaerythritol with 3(3',5'-ditertiary butyl, 4'-hydroxy phenyl) propionic acid, b. between about 0.1 and about 0.4% by weight of N,N''' diacetyl N',N'' adipoyl dihydrazide, and c. between about 0.15 and about 0.8% by weight of a linear polyester of 3,3' thiodipropionic acid with a glycol of the general formula HO—R—OH wherein R is a cycloalkylene or branched alkylene radical in which the carbon atom bonded to each —OH group is a primary carbon, provided that the weight of (a) is substantially greater than that of either (b) or (c) and the weight of (c) is not less than about equal to that of (b). Preferably the weight of (c) > the weight of (b) and the weight of (a) > weight of (b)+(c).

12 Claims, No Drawings

STABILIZED PROPYLENE-BASED POLYMER COMPOSITIONS

CROSS-REFERENCE TO RELATED APPLICATION

This application is a continuation-in-part of U.S. application Ser. No. 464,409, filed on Apr. 26, 1974 and now abandoned.

BACKGROUND OF THE INVENTION

1. Field of the Invention

This invention relates to polymeric compositions which are particularly suited for use as electrical insulation coatings on copper wires in underground cables. In these underground installations, the insulated wires are surrounded by a packing of petrolatum or other soft hydrocarbon medium which is used to keep out water but has been found to accelerate oxidation and heat degradation of the polymeric coatings. The present invention is directed toward the development of a stabilizer system which provides superior insulation coatings for use in this complicated environment. More particularly, it relates to such insulating compositions in which the polymeric component is derived largely from propylene and three different stabilizers are used therein in certain critical and unconventional concentrations and proportions thereby providing surprisingly long lasting protection of the insulation against degradation.

2. Description of the Prior Art

It is well known that $\alpha$-olefinic polymers such as polyethylene, polypropylene and the like, including various copolymers and/or blends of same, are susceptible to degradation due to heat, oxidative attack and other environmental influences. Literally hundreds of additives have been proposed by those skilled in the art as having the capability to reduce the severity of such degradation in hydrocarbon based materials, and many have been used with some success to increase the stability of polymeric products under normal environmental conditions. However, soon after isotactic polypropylenes and other crystalline polymers derived predominantly from propylene became commercially available and were used to insulate electrical conductors made of copper and other metals, it was discovered that the use of the conventional heat and antioxidant stabilizer additives in such insulating compositions in the accepted amounts and combinations failed to provide adequate service life.

After these failures had been traced to catalytic interactions caused by the presence of copper or other metals in the electrical conductors, considerable progress was made in alleviating the premature failures of these insulating materials by the inclusion in the propylene based polymers used therein of various metal deactivator compounds such as chelating agents. For example, the use of certain organic hydrazide or hydrazine compounds in such a manner is disclosed in U.S. Pat. Nos. 3,438,935 and 3,484,285. It appears from these two prior art disclosures that the best results are obtained by using said compounds in a concentration of about 0.5% based upon the weight of the polymeric material, i.e. in amounts about equal to the concentration of the primary antioxidant stabilizing additive contained in said polymeric material.

Unfortunately, even when such improved polypropylene-based compositions were employed in waterproof underground cable assemblies, the level and duration of stability of the insulation coatings became insufficient, apparently because of the extractive action of the petrolatum or other soft hydrocarbon filler material used as the waterproof packing around the insulated electrical conductors. For example, based upon accelerated thermal oxidation laboratory tests in Differential Scanning Calorimeters at 200°C in the presence of copper, crystalline polymers derived largely from propylene and containing 1% by weight of a hindered phenolic type antioxidant and 1% by weight of a hydrazide compound show an induction period of only about 10 minutes after extraction for 8 hours at 85°C in U.S.P. petrolatum compared to about 100 minutes before extraction.

GENERAL SUMMARY OF THIS INVENTION

The present invention is directed to propylene-based polymer compositions which maintain a high degree of thermal oxidative stability in the presence of copper even under exposure to petrolatum or other soft hydrocarbon plastics or jellies. This exceptional performance is attained by using three different stabilizer additives in combination as follows: (a) the pentaerythritol tetraester of 3(3',5' ditertiary butyl, 4'hydroxyphenyl) propionic acid; (b) N,N''' diacetyl-N',N'' adipoyl dihydrazide and (c) a polyester compound the molecular structure of which consists principally of the interlinked condensation units resulting from esterification reaction between thiodipropionic acid and glycols of the general formula HO—R—OH where R is a cycloalkylene or branched alkylene radical having a primary carbon atom bonded to each —OH. Furthermore, in order to assure an enhanced synergistic level of oxidation resistance in the presence of both copper and a soft hydrocarbon medium such as petrolatum, I have found that these three components must be added to the polypropylene based material in carefully prescribed proportioned concentrations. Thus, the concentration of component (b), the N,N''' diacetyl N',N'' adipoyl dihydrazide, is limited to a minor fraction of a percent by weight of the propylene-based polymer while component (a) is added in a much larger concentration, preferably at least double (and usually at least triple) the concentration of component (b). The concentration of the polyester component (c) is generally intermediate the other two components, i.e. should be at least about equal to the concentration of component (b) and substantially below the concentration of component (a). In fact, maximum synergism in the above type of oxidation resistance is generally achieved in propylene-based systems of practical interest when the concentration by weight of (a) is close to double that of (c) and about four times that of (b).

DETAILED DESCRIPTION AND PREFERRED EMBODIMENTS

The polymer systems of particular interest herein are those in which the polymeric content is derived predominantly from $\alpha$-mono olefinic aliphatic hydrocarbons of 2 to 8 carbon atoms wherein propylene accounts for most of the monomer content, i.e. propylene represents at least 60% (and preferably at least 75%) by weight of the total $\alpha$-olefin content. Especially preferred systems are those in which ethylene in either homo-or co-polymerized state amounts to between about 2% to about 25% of the propylene content therein, e.g. highly crystalline propylene-based copolymers in which ethylene accounts for from about 3 to about 15% of their total weight.

The primary and predominant stabilizer (a), i.e. the pentaerythritol tetra-ester of 3(3',5'-ditertiary butyl, 4'-hydroxy phenyl) propionic acid, is added in concentrations of between about 0.4 and about 1.6% by weight and preferably between about 0.6 and about 1.2%.

The concentration of the second additive (b), i.e. the N,N''' diacetyl N',N'' adipoyl dihydrazide is maintained between about 0.1 and about 0.4% by weight and preferably between about 0.15% and about 0.3%.

Finally, the concentration of the third additive (c), i.e. the linearly interlinked polyester compound is regulated between about 0.15 and about 0.8% by weight and preferably between about 0.3 and about 0.6%.

Furthermore, as previously stated, the relative amounts of the three additives are carefully coordinated so that the concentration of (a) is much larger than that of either (b) or (c) and the amount of (c) is not less than about equal to (b). Preferably, additive (c) is used at a higher concentration level than (b) and the concentration of (a) is greater than the concentrations of (b) and (c) combined. Ideally, the weight proportions of (a):(c):(b) are about 4:2:1.

All three of the stabilizer components of this invention have been selected from the tremendous multiplicity of organic compounds which have been suggested as capable of providing increased thermal and oxidation resistance in polymeric systems. Accordingly, suitable methods for preparing same have already been disclosed in the prior art. Thus, a general method for preparing component (a) is described in U.S. Pat. No. 3,285,855 of Dexter et al. wherein reference is also made to U.S. application Ser. No. 359,460 filed Apr. 13, 1964 by same applicants for further process details. Likewise, component (b) is described in U.S. Pat. No. 3,734,885 together with methods of preparing same. Finally, U.S. Pat. No. 3,590,056 described methods of reacting thiodipropionic acid with glycols to form linearly interlinked polyester structures analogous to the basic structure characterizing the polyester compounds which comprise my component (c).

In this connection, my preferred component (c) compounds are relatively higher in molecular weight than most of the polyesters of thiodipropionic acid specifically described in U.S. Pat. No. 3,590,056. Thus, the polyesters used in the present invention should have an average molecular weight of at least about 1500 and preferably 2000 or more. For example, an ideal MW range appears to lie between about 2000 and about 6000.

The following experimental examples further illustrate the present invention and demonstrate how certain proportions of the above three stabilizer components contribute enhanced stability to polypropylene-based polymer compositions under the influence of both metallic oxidation catalysts such as copper and soft hydrocarbon extractants such as petrolatum. In all of these examples, the concentrations and proportions of all components are specified on a weight basis.

EXPERIMENTAL TECHNIQUE USED IN EXAMPLES

The base polymer used was a highly crystalline copolymer of propylene and ethylene containing about 12 weight percent ethylene and having a density of about 0.9 and a melt index at 230°C of about 3 grams/10min.

The test specimens were prepared by compression molding 10 mil plaques from mixtures prepared by milling in a laboratory Banbury a weighed sample of the above copolymer with certain combinations of the following three stabilizer components:

a. the pentaerythritol tetraester of 3(3',5'-ditertiary butyl, 4'-hydroxy phenyl) propionic acid;
b. N,N''' diacetyl N',N'' adipoyldihydrazide; and
c. the condensed polymeric reaction product of an esterification reaction between 3,3'-thiodipropionic acid and a cycloalkylene or branched alkylene glycol.

In all of the main examples, the glycol was 1–4 cyclohexanedimethanol and the average molecular weight of the resulting linear polyester was about 2000. Alternative compounds as noted were used as component (c) in the supplementary examples.

The relative stability of the test compositions was determined by the following accelerated aging procedure. Test strips 1½inch × 1½inch square were cut from each 10 mil plaque. After immersing each test strip in U.S.P. grade petrolatum at 85°C for 8 hours, the strips were wiped clean and hung in an air circulating oven at 85°C for 18 hours.

Finally, a small disc about one fourth inch in diameter was cut from each of these extracted test strips and placed upon a copper pan in a duPont differential scanning calorimeter where it was heated to 200°C and subjected to a differential thermal analysis in a pure oxygen atmosphere. The induction period in minutes before onset of rapid exothermic oxidative degradation as determined from this analysis gives a good indication of the relative stability of the test compositions in underground cable installations.

EXAMPLE I

The results of rating six different compositions in the above manner while holding the total stabilizer concentration constant at 0.8% and varying the proportions of the three individual stabilizer components is reported in the following table:

| Batch No. | Component Concentrations (%) | | | DTA Induction Time (min) |
|---|---|---|---|---|
| | (a) | (b) | (c) | |
| 1* | 0.5 | 0.1 | 0.2 | 36 |
| 1A* | 0.5 | 0.15 | 0.15 | 32 |
| 2 | 0.1 | 0.2 | 0.5 | 18 |
| 3 | 0.5 | 0.2 | 0.1 | 26 |
| 4 | 0.1 | 0.5 | 0.2 | 23 |
| 4A* | 0.4 | 0.2 | 0.2 | 31 |

*Batches wherein (a) > (b) and (a) > (c) and (c) ≧ (b)

EXAMPLE II

In an analogous manner to Example I, the total stabilizer concentration was held constant at 1.1% while varying the proportions of the individual components with the following results:

| Batch No. | Component Concentrations (%) | | | DTA Induction Time (min) at 200°C |
|---|---|---|---|---|
| | (a) | (b) | (c) | |
| 5* | 0.8 | 0.1 | 0.2 | 43 |
| 5A* | 0.8 | 0.15 | 0.15 | 40 |
| 6 | 0.2 | 0.1 | 0.8 | 25 |
| 7* | 0.6 | 0.2 | 0.3 | 42 |
| 7A* | 0.5 | 0.3 | 0.3 | 38 |
| 8 | 0.2 | 0.4 | 0.5 | 26 |

| Batch No. | Component Concentrations (%) | | | DTA Induction Time (min) at 200°C |
|---|---|---|---|---|
| | (a) | (b) | (c) | |
| 9 | 0.4 | 0.5 | 0.2 | 30 |

*Batches wherein (a) > (b) and (a) > (c) and (c) ≥ (b)

When batch 7 was repeated using as component (c) a linear polyester of over 1500 in average molecular weight formed by intercondensation of 3,3' thiodipropionic acid with neopentyl glycol instead of the 1–4 cyclohexane dimethanol polyester, the DTA induction time was 38 minutes. However, when the analogous polyester made by esterification of 3,3', thiodipropionic acid with ethylene glycol was substituted as component (c) in another batch 7', the DTA induction time was only 20 minutes.

EXAMPLE III

In this case, a comparison was made varying the individual components while holding the total stabilizer content at 1.4% with these results:

| Batch No. | Component Concentrations (%) | | | DTA Induction Time (min) at 200°C |
|---|---|---|---|---|
| | (a) | (b) | (c) | |
| 9A* | 1.0 | 0.2 | 0.2 | 55 |
| 10* | 0.8 | 0.2 | 0.4 | 62 |
| 10A* | 0.8 | 0.3 | 0.3 | 54 |
| 11 | 0.8 | 0.4 | 0.2 | 40 |
| 12 | 0.2 | 0.4 | 0.8 | 26 |
| 13 | 0.4 | 0.8 | 0.2 | 32 |
| 14* | 0.9 | 0.2 | 0.3 | 57 |
| 15* | 0.6 | 0.3 | 0.5 | 53 |
| 15A* | 0.6 | 0.4 | 0.4 | 45 |

*Batches wherein (a) > (b) and (a) > (c) and (c) ≥ (b)

EXAMPLE IV

Similar tests were run at a total stabilizer concentration of about 1.6% with the following results:

| Batch No. | Component Concentrations (%) | | | DTA Induction Time (min) at 200°C |
|---|---|---|---|---|
| | (a) | (b) | (c) | |
| 16* | 0.9 | 0.23 | 0.46 | 74 |
| 16A* | 1.0 | 0.3 | 0.3 | 67 |
| 17 | 0.5 | 0.25 | 0.85 | 54 |
| 18* | 0.7 | 0.3 | 0.6 | 65 |
| 18A* | 0.8 | 0.4 | 0.4 | 64 |
| 19 | 0.7 | 0.6 | 0.3 | 46 |
| 19A | 0.7 | 0.2 | 0.7 | 57 |

*Batches wherein (a) > (b) and (a) > (c) and (c) ≥ (b)

The substitution of a linear polyester of about the same average molecular weight formed by the intercondensation of 3,3'-thiodipropionic acid with 2,2,4,4 tetramethyl cyclobutene 1–3 diol as component (c) in the above example gives substantially equal stability performances.

EXAMPLE V

In this example, comparisons are made of different proportions of the individual stabilizers at a total concentration of about 2% with results as shown below:

| Batch No. | Component Concentrations (%) | | | DTA Induction Time (min) at 200°C |
|---|---|---|---|---|
| | (a) | (b) | (c) | |
| 20* | 1.0 | 0.3 | 0.7 | 99 |
| 20A* | 1.0 | 0.5 | 0.5 | 89 |
| 21 | 0.7 | 0.3 | 1.0 | 64 |
| 22* | 1.6 | 0.1 | 0.3 | 84 |
| 22A* | 1.2 | 0.4 | 0.4 | 92 |
| 23 | 0.6 | 0.8 | 0.6 | 63 |
| 24 | 0.4 | 0.8 | 0.8 | 54 |

*Batches wherein (a) > (b) and (a) > (c) and (c) ≥ (b)

Analyzing the above examples, it can be seen that for a given total amount of combined stabilizer additives, the results obtained under the described test conditions when the individual stabilizer concentrations are maintained as (a) > (b) and (a) > (c) and (c) > or = (b) are strikingly superior to those obtained whenever the relative amounts of two or more of said individual components are reversed.

As will be obvious to those skilled in the art, considerable variations and additional modifications can be made in supplemental elements of this invention while still enjoying the advantages of the basic concept thereof. For example, the propylene-based polymer may comprise various copolymers of propylene or blends of other polymers and/or copolymers including homopolymers and copolymers with monomers such as ethylene, butylenes, etc. Also various supplemental additives in minor amounts can be used for their known specific functions such as dyes and pigments for color coding, simplified identification etc., and anti-acids, ultraviolet light absorbers, etc., for neutralizing potentially hostile agents found in certain special applications.

Of course, it must be emphasized that the major field of application for the compositions of the present invention lies in the area of electrical insulation, particularly as wire and cable coatings. Accordingly, in this area where dielectric properties are so important, additives which tend to detract therefrom should be avoided or carefully limited in concentration. In this connection, it should be noted emphatically that the use of the combined stabilizer additives in the amounts advocated by the present inventions, i.e. in total amounts up to about 2.5% by weight, has been found to have very little effect on dielectric properties such as dielectric constant and dissipation factor as determined by ASTM test D-150-64T.

Having described my invention together with preferred embodiments of same, what is claimed is:

1. A stabilized normally solid polymeric composition which is highly resistant to degradation at high temperatures even in the presence of a metal such as copper comprising a base polymer the major fraction of which by weight is derived from propylene and which contains a carefully balanced, extraction resistant stabilizer system composed by weight of:
   a. between about 0.4 and about 1.6% of the tetraester of pentaerythritol with 3(3',5'-ditertiary butyl, 4'-hydroxy phenyl) propionic acid,
   b. between about 0.1 and about 0.4% of N,N'" diacetyl N',N" adipoyl dihydrazide, and
   c. between about 0.15 and about 0.8% of a linear esterification product of the condensation reaction between 3,3' thiodipropionic acid and glycols of the general formula HO—R—OH wherein R is a cycloalkylene or branched alkylene radical in which the carbon atom bonded to each —OH group is a primary carbon;

provided that the amount of (a) is substantially greater than the amount of either (b) or (c) and the amount of (c) is at least about equal that of (b).

2. The stabilized, normally solid polymeric composition of claim 1 wherein at least 60% by weight of the base polymer is derived from propylene.

3. The stabilized polymeric composition of claim 2 wherein the base polymer is a copolymer of two or more mono-αolefins with propylene comprising at least 75% by weight.

4. The stabilized polymeric composition of claim 3 wherein ethylene is the principal auxiliary monomer that is combined with the propylene.

5. The stabilized polymeric composition of claim 1 wherein the concentration by weight of stabilizer component (a) is at least about double that of component (b) and the concentration of component (c) is substantially above that of component (b) but substantially below that of component (a).

6. A normally solid polyolefinic polymer composition with a high resistance to oxidative degradation even in the presence of catalytic metals such as copper comprising a polymer base the major fraction of which by weight is derived from propylene and a carefully balanced stabilizer system consisting by weight of:
   a. between about 0.6 and about 1.2% of the tetraester of pentaerythritol with 3(3',5'-ditertiary butyl, 4'-hydroxy phenyl) propionic acid,
   b. between about 0.15 and about 0.3% of N,N''' diacetyl N',N'' adipoyldihydrazide, and
   c. between about 0.3 and about 0.6% of a linear polyester of at least 1500 in average molecular weight between 3,3' thiodipropionic acid and a di-primary cyclalkylene or branched alkylene glycol;

provided that the concentration of component (a) is at least double that of component (b) and the concentration of component (c) is at least about equal that of (b) but substantially less than that of (a).

7. The normally solid polyolefinic polymer composition of claim 6 wherein the base polymer is a copolymer of at least 75% by weight propylene with at least one other mono-αolefin of 2 to 8 carbon atoms.

8. The normally solid composition of claim 7 wherein the other mono-αolefin is largely ethylene.

9. The normally solid composition of claim 7 wherein component (c) is a linear polyester of about 2000 average molecular weight between 3,3'-thiodipropionic acid and 1-4 cyclohexanedimethanol.

10. The normally solid composition of claim 9 wherein the relative weight concentrations of components (a):(b):(c) are approximately in the proportion of 4:1:2 respectively.

11. The normally solid composition of claim 6 wherein the concentration by weight of stabilizer component (a) is at least about triple that of component (b) and the concentration of component (c) is substantially more than that of component (b) but substantially less than that of component (a).

12. The stabilized polymeric composition of claim 5 wherein the amount of stabilizer component (a) is greater than the amounts of components (b) and (c) combined.

* * * * *